United States Patent Office 3,422,135
Patented Jan. 14, 1969

3,422,135
DL-α-ALKYL-α-AMINO ACID AND INTERMEDIATES THEREFOR
Shunichi Yamada, 2601 5-chome, Setakaya-ku, Tokyo, and Kazuo Achiwa, Kita-ku, Tokyo, Shiro Terashima, Setagaya-ku, Tokyo, and Akio Iwaki, Bunkyo-ku, Tokyo, Japan; said Kazuo, said Terashima, and said Iwaka assignors to said Shunichi Yamada
No Drawing. Filed Apr. 15, 1964, Ser. No. 360,068
Claims priority, application Japan, Apr. 23, 1963, 38/20,773
U.S. Cl. 260—471      6 Claims
Int. Cl. C07c 99/12

ABSTRACT OF THE DISCLOSURE

Resolution of a racemic α-alkyl-α-amino acid is effected by reacting optically active menthol with an N-acylate of the oxazolone of the racemic acid, separating the thus-prepared optical isomers, and deacylating and deesterifying the separated individual optical isomers.

---

This invention relates to an improved method of recovering the individual optically active forms from DL-α-alkyl-α-amino acid, and to intermediates employed in such method.

Briefly stated, the present invention makes it possible easily to resolve DL-α-alkyl-α-amino acid into two optically active α-alkyl-α-amino acids in good yield by forming menthyl esters of DL-α-alkyl-α-amino acid with optically active menthol after acylating the α-alkyl-α-amino acid to the corresponding N-acyl-amino acid and forming an oxazolone ring by dehydration of the N-acyl compound or after forming the oxazolone derivative directly from the amino acid by acylation and cyclodehydration in one step.

Several methods of separating optically active forms from synthetic DL-α-alkyl-α-amino acid are described in Annalen der Chemie, vol. 406, 5–10 (1914), Journal of Biological Chemistry, vol. 76, 299–318 (1928) and Journal of American Chemical Society, vol. 74, 4701 (1952). According to these prior methods, the amino radicals of DL-α-alkyl-α-amino acid are acylated to introduce formyl, acetyl, chloroacetyl or benzoyl radicals and then reacted with optically active base such as brucine, cinchonine or cinchonidine. Then, optically actively diastereoisomers are separated from the resulting salts by taking advantage of the different solubilities in solvents mixture. In another method, the said amino acids are separated by taking advantage of the different velocities of enzymatic hydrolysis of the acyl radicals of D- and L-α-alkyl-N-acyl amino acids. The said prior separating methods, however, are often either quite difficult to carry out or give unsatisfactory yields.

According to the present invention, DL-α-alkyl-α-amino acid is first acylated to the corresponding N-acyl compound such as the N-acetyl, N-chloroacetyl or N-benzoyl derivative, after which an oxazolone ring is formed by dehydrating the N-acyl compound, or the oxazolone derivative is obtained directly from the amino acid by effecting acylation and cyclodehydration in one step. Reacting the said oxazolone derivative with 1-menthol gives the menthyl esters of said amino acid accompanied by opening of the oxazolone ring. In this case, the said DL-α-alkyl-α-amino acid forms two diastereoisomeric esters composed of Dl and Ll pairs respectively. These two diastereoisomeric esters have different solubilities in solvents, so that their separation is readily effected with the aid of such solvents. Other conventionally employed methods of separating diastereoisomeric esters, such as chromatography, are also effective in this case. The two separated diastereoisomeric esters have different optical activities and the two α-alkyl-α-amino acids which are obtained from these diastereoisomers by hydrolysis with caustic alkalies show antipodal D and L optical activities respectively.

The process of the present method is represented by the following scheme:

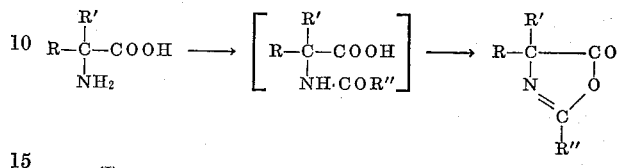

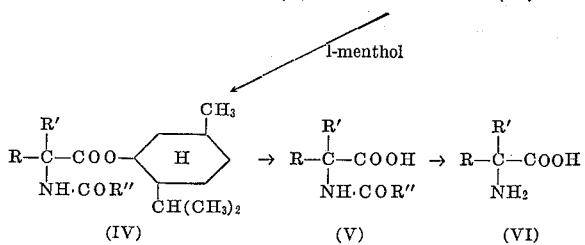

wherein each of R and R' is substituted or unsubstituted lower alkyl, and R" is lower alkyl, chloro(lower)alkyl or substituted or unsubstituted phenyl. Lower alkyl is e.g. methyl, ethyl, propyl, isopropyl, butyl, etc. Substituents on the lower alkyl may be diverse in character and may include e.g. halogen (Cl, Br, etc.), phenyl, benzyl, benzyloxy, methoxybenzyl, etc. Substituted phenyl groups comprise e.g. chlorophenyl, lower alkylphenyl, lower alkoxyphenyl, etc.

Formula IV represents two diastereoisomeric esters, and the respective isomer is hydrolyzed to the corresponding optically active amino acid VI through the corresponding compounds V which are appropriate optical antipodes; however, compound IV can also be hydrolyzed to the corresponding antipode VI in one step by performing the deacylation and deesterification at the same time.

The method of separation of the two optically active diastereoisomers in this invention is very easily performed and gives a satisfactory yield as compared to the already known methods.

It will be clear from the foregoing, moreover, that the invention is applicable to the resolution of a wide variety of DL-α-alkyl-α-amino acids, the indispensable moiety of the latter being the

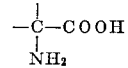

moiety.

The present method does not use a physiologically toxic compound, such as brucine or cinchonine. These advantages of this invention make it of great value in the industrial production of optically active α-alkyl-α-amino acid.

The following examples serve to illustrate the present invention without, however, limiting the same therein. Parts by weight bear the same relationship to parts by volume as do grams to milliliters.

EXAMPLE 1

21 parts by weight of α-acetamino-γ-benzyloxy-α-methyl-n-butyric acid are refluxed in 210 parts by volume of acetic anhydride for 6 hours. After removal of excess acetic anhydride and acetic acid by distillation, 17.2 parts by weight of 2,4-dimethyl-4-(β-benzyloxyethyl)-oxazolone are obtained by distillation of the residue under reduced pressure.

On the other hand, 14.2 parts by weight of l-menthol ($[\alpha]_D^{12} = -51.3°$ (c.=3.06 CH$_3$OH)) are added to a suspension of 3 parts by weight of powdered metallic Na in 100 parts by volume of benzene, and the mixture allowed to stand overnight and then refluxed for 2 hours. The unreacted metallic Na is removed from the mixture, 30 parts by volume of benzene added followed by a solution of 17.2 parts by weight of the previously-prepared 2,4-dimethyl-4-(β-benzyloxyethyl)-oxazolone in 20 parts by volume of benzene. The reaction mixture is stirred for 4 hours at room temperature (20–30° C.) and allowed to stand overnight. 100 parts by volume of benzene are then added thereto and the benzene layer of the mixture is washed with aqueous dilute acetic acid, aqueous dilute alkali carbonate solution and finally with water.

After drying over anhydrous sodium sulfate, benzene is removed by evaporation. The residue is distilled under reduced pressure. 23.5 parts by weight of a fraction, B.P.$_{0.12}$ 198–220° C., are obtained.

When the thus obtained fraction is dissolved in 70 parts by volume of n-hexane and allowed to stand for a moment, 15.7 parts by weight of white crystal are obtained (hereinafter referred to as "A$_1$-crystal"). Upon further standing of the mother solution for 48 hours, 2.8 parts by weight of white crystal (hereinafter referred to as "B$_1$-crystal") are obtained.

The said crude "A$_1$-crystal" and "B$_1$-crystal," upon recrystallization from n-hexane, give respectively "A$'_1$-crystal" having M.P. 98.5–100.5° C., $[\alpha]_D^{18} = 49.5°$ (c.=0.92 CH$_3$OH) and "B$'_1$-crystal," M.P. 72.5–73.5° C., $[\alpha]_D^{15} = 29.2°$ (c.=2.02 CH$_3$OH).

2 parts by weight of "A$'_1$-crystal" are dissolved in a mixture of 30 parts by weight of ethanol and 30 parts by volume of aqueous NaOH solution containing 30 parts by weight of NaOH, and refluxed for 5 hours.

After concentrating the mixture to about one-fourth its volume under reduced pressure and extracting menthol therefrom by means of ether, the aqueous layer is adjusted to pH 1.0 with conc. HCl and the separated white crystal is collected. By recrystallization of the said white crystal from 20% ethanol, 1.3 parts by weight of white crystal are obtained: this is (−)-α-acetamino-γ-benzyloxy-α-methyl-n-butyric acid which melts at 148.5–150.5° C., $[\alpha]_D^{18} = -9.5°$ (c.=1.24 CH$_3$OH).

In a similar manner, 1.2 parts by weight of white needle crystal are obtained from the "B$'_1$-crystal"; M.P. 153.5–154.5° C. $[\alpha]_D^{18} = +10.9°$ C. (c.=1.84 CH$_3$OH). Each of the thus-obtained (−)-α-acetamino-γ-benzyloxy-α-methyl-n-butyric acid and (+)-α-acetamino-γ-benzyloxy-α-methyl-n-butyric acid is refluxed with 20% hydrochloric acid for several hours; the former gives one optically active isomer, (−)-α-amino-benzyloxy-α-methyl-n-butyric acid, and the latter gives the other optically active isomer, (+)-α-amino-γ-benzyloxy-α-methyl-n-butyric acid.

EXAMPLE 2

20 parts by weight of 3,4-dimethoxyphenyl-α-methyl-alanine are refluxed for 6 hours with 200 parts by volume of acetic anhydride. After removal of excess acetic anhydride and acetic acid by distillation, 15 parts by weight of 2,4-dimethyl-4-(3,4-dimethoxybenzyl)-oxazolone are obtained by distillation of the residual oil under reduced pressure. To a suspension of 2.8 parts by weight of powdered metallic Na in 100 parts by volume of benzene, 13.3 parts by weight of l-menthol ($[\alpha]_D^{12} = 51.3°$ (c.=3.06 (CH$_3$OH)) are added and the mixture allowed to stand overnight and then refluxed for 2 hours. The unreacted metallic Na is removed and 100 parts by volume of benzene are added, followed by a solution of 15 parts by weight of 2,4-dimethyl-4-(3,4-dimethoxybenzyl)-oxazolone in 25 parts by volume of benzene. The mixture is stirred for 6 hours at room temperature and allowed to stand overnight, 100 parts by volume of benzene are added to this solution and the benzene-layer of the reaction mixture is washed with dilute acetic acid, saturated sodium carbonate solution and finally with water. After drying over anhydrous sodium sulfate, benzene is removed by distillation. Distillation of the residual oil under reduced pressure gives 17.5 parts by weight of a fraction, B.P. 215–220° C./0.7 mm. Hg.

When the fraction is dissolved in 160 parts by volume of n-hexane containing 10% of benzene and allowed to stand for 3 hours, 5.2 parts by weight of white crystals are obtained (hereinafter referred to as "A$_2$-crystal"). When the mother solution is evaporated to dryness and 30 parts by volume of n-hexane added thereto, 8.4 parts by weight of white powder-like crystals (hereinafter referred to as "B$_2$-crystal") are obtained. The said crude "A$_2$-crystal" and "B$_2$-crystal," after recrystallization of each of them from n-hexane containing ether, respectively yield "A$'_2$-crystal" having M.P. 136–137° C., $[\alpha]_D^{14} = -35.7°$ (c.=0.28 CH$_3$OH) and "B$'_2$-crystal" having M.P. 137–138° C., $[\alpha]_D^{17} = 109.0°$ (c.=1.34 CH$_3$OH).

A solution of 4.1 parts by weight of "A$'_2$-crystal" dissolved in a mixture of 120 parts by volume of ethanol and 120 parts by volume of 25% aqueous caustic potash solution is refluxed gently for 40 minutes and concentrated to about 50 parts by volume. After cooling, menthol is extracted twice with 250 parts by volume portions of ether. The aqueous layer is adjusted to pH 1.0 with conc. HCl and saturated ethyl acetate. The ethyl acetate layer is dried over anhydrous Na$_2$SO$_4$ and the solution is evaporated. By recrystallization of the residue from ethyl acetate, 1.2 parts by weight of powder-like white crystals, (+)-N-acetyl-α-methyl-3,4-dimethoxyphenylalanine having M.P. 188.5–189° C., $[\alpha]_D^{18} = +65.2°$ (c.=0.92 CH$_3$OH) are obtained. The same treatment of "B$'_2$-crystal" gives 1.4 parts by weight of powder-like white crystals, (−)-N-acetyl-α-methyl-3,4-dimethoxyphenylalanine having M.P. 188–188.5° C., $[\alpha]_D^{19} = 67.3°$ (c.=0.52 CH$_3$OH).

Each of the thus-obtained (+)-N-acetyl-α-methyl-3,4-dimethoxyphenylalanine and (−)-N-acetyl-α-methyl-3,4-dimethoxyphenylalanine is hydrolyzed with 20% hydrochloric acid for several hours on a water bath. The former gives one optically active isomer, (+)-α-methyl-3,4-dimethoxyphenylalanine, and the latter gives the other optically active isomer, (−)-α-methyl-3,4-dimethoxyphenylalanine.

EXAMPLE 3

8.7 parts by weight of N-benzoyl-isovaline are refluxed for 6 hours with 80 parts by volume of acetic anhydride. After removal of the excess acetic anhydride and glacial acetic acid by distillation, 6.54 parts by weight of 4-ethyl-4-methyl-2-phenyloxazolone melting at 46–47° C. are obtained by the distillation of brown residual oil under reduced pressure.

To a suspension of 1.01 parts by weight of powdered metallic Na in 30 parts by volume of benzene, 6.86 parts by weight of l-menthol ($[\alpha]_D^{12} = -51.3°$ (c.=3.06 CH$_3$OH)) are added and the mixture refluxed for 2 hours. The unreacted metallic Na is removed from the reaction mixture and 20 parts by volume of benzene and 6.54 parts by weight of 4-ethyl-4-methyl-2-phenyl-oxazolone are added.

The mixture is stirred for 4 hours at room temperature and 50 parts by volume of benzene are added thereto and the benzene solution is washed with 50 parts by volume of aqueous dilute acetic acid and with water, and dried over anhydrous sodium sulfate. After removal of benzene from the reaction mixture by distillation, a brown glassy residue is obtained. Distillation of this residue under reduced pressure gives 9.16 parts by weight of a fraction, B.P. 173–190° C./0.08 mm. Hg.

When this fraction is dissolved in 10 parts by volume of n-hexane and allowed to stand for about 12 hours, 5.4 parts by weight of white crystal are obtained (hereinafter referred to as "A₃-crystal"). Further concentration of the mother liquor gives 1.9 parts by weight of white crystals (hereinafter referred to as "B₃-crystal").

The said crude "A₃-crystal" and "B₃-crystal" are recrystallized from n-hexane. The former gives "A'₃-crystal" having M.P. 110–111.5° C., $[\alpha]_D^{18}=-54.7°$ (c.=1.28 CH₃OH) and the latter gives "B'₃-crystal" having M.P. 72.5–73.5° C., $[\alpha]_D^{12}=-41.9°$ (c.=1.48 CH₃OH).

0.5 part by weight of "A'₃-crystal" is dissolved in 7 parts by volume of 50% aqueous ethanol containing 0.78 part by weight of caustic potash and refluxed for 6 hours. At the end of the reaction, ethanol is removed by distillation and 10 parts by volume of water are added and the l-menthol is then removed by shaking with benzene.

By addition of conc. HCl to this aqueous solution to adjust it to pH 5.0, 0.28 part by weight of plate-like crystal, (—)-N-benzoylisovaline having M.P. 176–178° C., $[\alpha]_D^{16}=-10.4°$ (c.=1.84 CH₃OH) is obtained.

The same treatment of "B'₃-crystal" gives 0.145 part by weight of white needle crystal, (—)-N-benzoylisovaline melting at 176–178° C., $[\alpha]_D^{12}=-10.1°$ (c.=1.44 CH₃OH).

0.5 part by weight of (—)-N-benzoylisovaline is refluxed with 15 parts by volume of 48% hydrobromic acid and 15 parts by volume of water for 6 hours. The mixture is cooled and the separated benzoic acid filtered off and then residual benzoic acid is extracted with benzene.

The mother solution is evaporated to dryness, the residue is dissolved in 9 parts by volume of water and the aqueous solution is passed through a column of Amberlite IR 120 [H form], and then after washing the column with water, isovaline is eluted with 10% aqueous ammonia.

The ammonia is removed by distillation and the residue is evaporated to dryness. By recrystallization of the crude isovaline with aqueous alcohol, 0.195 part by weight of isovaline hydrate ($[\alpha]_D=-11°$ H₂O) is obtained.

The same treatment of (—)-N-benzoylisovaline gives 0.15 part by weight of (—)-isovaline.

Having thus disclosed the invention what is claimed is:

1. D,L-menthyl ester of an α-amino acid,

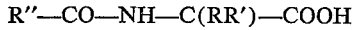

wherein the carbon alpha to the carboxyl groups is asymmetric; each of R and R' is a member selected from the group consisting of lower alkyl, halo-substituted lower alkyl, phenyl-substituted lower alkyl, benzyl-substituted lower alky, benzyloxy-substituted lower alkyl and methoxybenzyl-substituted lower alkyl; and R" is a member selected from the group consisting of lower alkyl, chloro (lower)alkyl, phenyl, chlorophenyl, lower alkylphenyl and lower alkoxyphenyl.

2. L-menthyl ester of an α-amino acid,

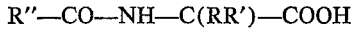

wherein the carbon alpha to the carboxyl group is asymmetric; each of R and R' is a member selected from the group consisting of lower alkyl, halo-substituted lower alkyl, phenyl-substituted lower alkyl, benzyl-substituted lower alkyl, benzyloxy-substituted lower alkyl and methoxybenzyl-substituted lower alkyl; and R" is a member selected from the group consisting of lower alkyl, chloro (lower) alkyl, phenyl, chlorophenyl, lower alkylphenyl and lower alkoxyphenyl.

3. D-menthyl ester of an α-amino acid,

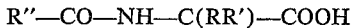

wherein the carbon alpha to the carboxyl group is asymmetric; each of R and R' is a member selected from the group consisting of lower alkyl, halo-substituted lower alkyl, phenyl-substituted lower alkyl, benzyl-substituted lower alkyl, benzyloxy-substituted lower alkyl and methoxybenzyl-substituted lower alkyl; and R" is a member selected from the group consisting of lower alkyl, chloro (lower) alkyl, phenyl, chlorophenyl, lower alkylphenyl and lower alkoxyphenyl.

4. DL - menthyl ester of α-acetamino-γ-benzyloxy-α-methyl-n-butyric acid.

5. DL-menthyl ester of N-acetyl-α-methyl-3,4-dimethoxyphenylalanine.

6. DL-menthyl ester of N-benzoyl-isovaline.

References Cited

Chemical and Pharmaceutical Bulletin (Japan); Yamada et al.; vol. 10 (1962), pp. 688–693.

LORRAINE A. WEINBERGER, *Primary Examiner.*

L. A. THAXTON, *Assistant Examiner.*

U.S. Cl. X.R.

260—482, 518, 519, 534, 307